May 27, 1958  C. R. ECKBERG  2,836,366
CONTROL APPARATUS
Filed Feb. 9, 1954  3 Sheets-Sheet 1

INVENTOR.
CURTIS R. ECKBERG
BY
Adams, Forward & McLean

May 27, 1958   C. R. ECKBERG   2,836,366
CONTROL APPARATUS

Filed Feb. 9, 1954   3 Sheets-Sheet 2

INVENTOR.
CURTIS R. ECKBERG
BY
Adams, Forward & McLean

May 27, 1958

C. R. ECKBERG

2,836,366

CONTROL APPARATUS

Filed Feb. 9, 1954

INVENTOR.
CURTIS R. ECKBERG
BY
Adams, Forward & McLean

United States Patent Office 2,836,366
Patented May 27, 1958

2,836,366

CONTROL APPARATUS

Curtis R. Eckberg, Port Washington, N. Y.

Application February 9, 1954, Serial No. 409,018

14 Claims. (Cl. 236—68)

This invention relates to control systems for agencies affecting the magnitude of variable conditions such as temperature, pressure, flow rate and amplifier gain. This invention in particular provides a means for use with electrically actuated controlling agencies which provides automatic regulation of the controlling agency to maintain the magnitude of the variable condition at any predetermined value or which can be utilized to drive a recorder of the magnitude of the variable condition.

It is an important object of this invention to provide means regulating the application of a controlling agency to a variable condition by intermittent actuation on a time proportioned basis determined by the departure of the magnitude of the variable condition from a predetermined value. It is also an object of this invention to provide for use of an averaging means for transforming the intermittent actuation of the controlling agency into continuous application thereof to the controlled condition at appropriate values varied in accordance with the departure of the variable condition from a predetermined magnitude.

It is a further object of this invention to effect actuation of a controlling agency according to a system of proportional actuation in which proportioning is effective throughout a throttling range and to provide maximum or minimum rate of application of the controlling agency when the magnitude of the variable is outside the throttling range.

A specific object of this invention is to provide time proportioned application of power to energize a controlling agency in the simplest manner without the use of elaborate mechanisms and without hindering the use of measuring instruments to indicate or record accurately the magnitude of the variable condition controlled.

This invention is dependent upon a unique method of actuating a circuit controlling device which controls application of electrical power to energize a controlling agency affecting the magnitude of a variable condition. The circuit controlling device is, in particular, operated by a differential dual heat flow bimetallic motor, one embodiment of which is more fully described in my copending application Serial No. 289,912, filed May 24, 1952, now United States Patent 2,744,178.

Briefly the differential dual heat flow device of my copending application comprises a pair of bimetallic members and a pair of heat radiators providing a first path of heat flow between one radiator and one bimetallic member and a second path of flow between the second radiator and the second bimetallic member. The bimetallic members are so mounted that differential changes between the two paths of heat flow will cause a relative movement of the bimetallic members which movement operates one or more electrical contacts. The differential dual heat flow bimetallic motor, thus employed to actuate a circuit controlling device, is operated in accordance with the position of a shield or vane affixed to the indicating member of an instrument for measuring a variable condition. The device is so positioned with respect to the indicating member that when the magnitude of the variable condition is at a predetermined value the vane partially and equally intercepts each path of heat flow providing a balanced dual heat flow condition. Departure of the variable condition from the predetermined value causes the vane to intercept more fully one path of heat flow and to lessen its interception of the other path of heat flow providing a differential unbalance in heat flow in the device which produces relative movement of the bimetallic members thus actuating the circuit controlling device. In its customary application the circuit controlling device connects electrical power to a controlling agency for the variable condition in a manner tending to return the variable condition to the desired operating magnitude.

Such a system, however, because of inherent time lags, for example, in the application of the controlling agency to the variable condition, will tend to produce an oscillation of the magnitude of the variable condition about the predetermined value by permitting overlong application of the controlling agency to the variable condition.

It is a specific object of this invention to develop time proportioned contact operation of a circuit controlling device actuated by a differential dual heat flow bimetallic motor such that a throttling range is provided as the magnitude of the variable condition approaches the desired operating value. In accordance with this object of the invention the minimum and maximum rates of the controlling agency are alternated for periods of time which vary in duration or rate or both with the magnitude of the variable condition within the throttling range.

It is another specific object of this invention to provide for use of an averaging means responsive to time proportioned contact operation of a circuit controlling device actuated by a differential dual heat flow bimetallic motor to establish continuous energization of a controlling agency at appropriate intermediate settings or positions of valves, potentiometers, motors or equivalent mechanical or electronic means to maintain a relatively continuous application of the controlling agency to a variable condition at values intermediate minimum and maximum operation.

Yet another specific object of this invention is the development of time proportioned contact operation produced by a differential dual heat flow bimetallic motor within two throttling ranges to obtain a floating control system in which one throttling range applies time proportioning in accordance with this invention to increase the application of the controlling agency to the variable condition and in which the other throttling range applies time proportioning in accordance with this invention to decrease the application of the controlling agency to the variable condition wherein the particular throttling range to be utilized is determined by the direction of the departure of the magnitude of the variable condition from a predetermined value.

These and other objects of this invention which will become apparent hereinafter are essentially obtained by means of a circuit controlling device through actuation thereof by a differential dual heat flow bimetallic motor the operation of which is responsive to a first thermal unbalance responsive to the magnitude of the variable condition to be controlled and a second thermal unbalance of periodic or intermittent alternating nature.

The first thermal unbalance can be produced by the position of a vane, as in the differential dual heat flow device of my aforenoted copending application, or it can be produced by other means, as for example by controlling the relative amounts of heat radiated from an extra pair of filaments through control of the voltage applied across each such filament. In any event it is essential to apply a first thermal unbalance to a pair of bimetallic strips, the departure of which from a balanced state is in response in quantity and quality to the departure of the magnitude of the variable condition, within certain limits, from a predetermined value.

The second thermal unbalance is produced by alternating the heat radiated by the two filaments, in the device of my copending application, by varying the applied voltage to each filament from one state in which one filament radiates more heat than the second to a state in which the second filament radiates an equal amount or a greater amount of heat than the first. The second thermal unbalance can, of course, be produced by other means, as for example by an oscillating vane or by a second pair of filaments, one associated with each strip, which are also controlled by varying the relative amounts of applied voltage. In any event the second thermal unbalance applied to the bimetallic motor is of a periodic or intermittent alternating character. The timing of such oscillations can be on an external, i. e., independent, basis, or it can be on a self-generated, i. e., automatic basis produced by operation of the bimetallic motor.

For a better understanding of the practice of my invention, reference is made to the accompanying drawings of which the following is a description.

Fig. 3, subdivided into

Fig. 4, subdivided into

Figure 1:
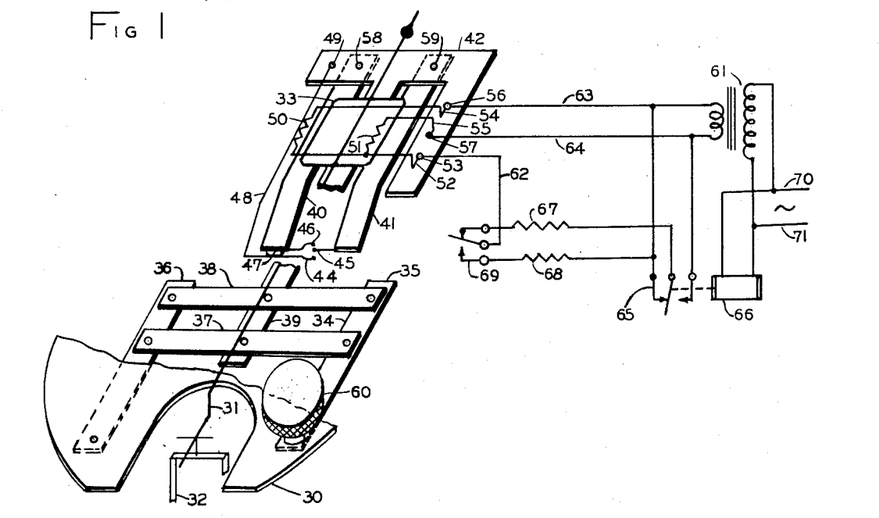
Fig. 1 illustrates in partially isometric and diagrammatic, and in partially schematic manner a differential dual heat flow bimetallic motor utilized in accordance with this invention.

In the drawings, referring to Fig. 1, a differential dual heat flow bimetallic motor actuated circuit controlling device suitable for use according to this invention is illustrated. The device includes an instrument 30 such as pyromillivoltmeter for measuring a variable condition such as the voltage produced by a thermocouple arrangement or the like. Instrument 30 is only partially shown in the drawing.

Insofar as the operation of the differential dual heat flow bimetallic motor is concerned, the essential element of the instrument 30 is indicator needle 31 operated by instrument 30 as for example by armature movement 32 and having a path of travel in which the position of the indicating needle 31 is responsive to the magnitude of the variable condition which instrument 30 measures. In the illustrated case indicating needle 30 rotates about an axis passing through armature 32. Near the outer end of needle 31 there is attached an aluminum foil vane 33. The particular material of construction of vane 33 can of course be varied. The fundamental requirement is that it be opaque to heat and preferably have heat reflecting characteristics.

A rotatable frame 34 is mounted on instrument 30 and comprises parallel links 35 and 36 each pivoted at one end to instrument 30, parallel links 37 and 38 pivotally connected at their ends to links 35 and 36 and frame extension 39 parallel to links 35 and 36 and pivotally connected near one end to the centers of parallel links 37 and 38. The pivots of links 35 and 36 to instrument 30 by which frame 34 is connected to instrument 30 are placed in line with the axis of armature 32, thus rotation of frame 34 is in a plane parallel to the path of travel of needle 31. Frame extension 39 can therefore be aligned with any given position of needle 31.

Near the outer extremity of frame extension 39 a pair of parallel bimetallic elements 40 and 41 are mounted. Each of elements 40 and 41 is fixed at one end to a crossbar 42 on frame extension 39 in such a manner that an increase in temperature will cause its free end to deflect upwardly.

At the free ends of elements 40 and 41 a three-contact switch is mounted. A contact 45 is affixed directly to bimetallic element 41 so that appropriate electrical connections to contact 45 can be made through bimetallic element 41. In order to accomplish this, cross-bar 42 is made of a suitable insulator material. Contact 46 is similarly affixed to bimetallic element 40. Additional contact 44 is also mounted on bimetallic element 40 but is insulated therefrom by a mounting block 47. A separate electrical lead 48 to contact 44 is connected to a suitable terminal post 49 on cross-bar 42. In the illustrated case it will be seen that both bimetallic elements 40 and 41 are positioned below the path of travel of vane 33 and that the spacing of the center lines of elements 40 and 41 is equal to the width of vane 33.

Positioned above the path of travel of vane 33 and aligned with bimetallic elements 40 and 41 are a pair of heat radiating filaments 50 and 51, respectively. These are connected by a common lead 52 to a terminal post 53 on cross-bar 42. The opposite ends of filaments 50 and 51 are separately connected by leads 54 and 55, respectively, to terminal posts 56 and 57, respectively, mounted to cross-bar 42. Terminal posts 58 and 59 mounted on cross-bar 42 are connected to bimetallic elements 40 and 41, respectively.

A knurled knob 60 is affixed to frame element 35 at its pivotal connection with instrument 30. Knob 60 is utilized to position bimetallic elements 40 and 41 and their associated heat radiators 50 and 51 relative to the path of travel of vane 33 so that vane 33 in a position corresponding to any predetermined magnitude of a variable condition measured by instrument will equally intercept the flow of heat from radiator 50 to element 40 and from radiator 51 to element 41 and departure of vane 33 from such position indicating departure of the magnitude of the variable condition from the predetermined value will cause an increase in the interception of heat flow from one heat radiator 50 or 51 to its respective bimetallic element 40 or 41 and will cause a decrease in the interception of heat flow from the other associated pair. Such a departure produces a relative movement of the free ends of bimetallic elements 40 and 41 which will operate one pair of contacts 45 and 46 or 45 and 44 depending upon the direction of the departure of vane 33 from the balanced position. In the illustrated case thermal unbalance caused by movement of vane 33 in a counter-clockwise direction will tend to close contacts 45 and 46 and will tend to open contacts 44 and 45. Clockwise movement of vane 33 will tend to produce the opposite effect.

Heat radiators 50 and 51 are filaments having electrical resistance and are supplied in series with energizing current from transformer 61 by leads 63 and 64 connected to terminal posts 56 and 57, respectively. A two position switch 65 is connected in series with resistor 67 in lead 62 to common terminal post 53. In one position, switch 65 connects resistor 67 between leads 62 and 63 and in its other position, between leads 62 and 64. An actuator 66 alternately throws switch 65 from one position to the other. Actuator 66 is an electrical timing device connected to A. C. power leads 70 and 71 to which the primary of transformer 61 is also connected. A manually operated single-pole double-throw switch 69 is connected in lead 62 to permit resistor 67 and switch 65 to be bypassed by resistor 68 connected to lead 63.

General analysis of the device of Fig. 1 can be made as follows, first assuming lead 62 is disconnected from common terminal post 53. Heat radiated from filaments 50 and 51 causes bimetallic strips 40 and 41, respectively, to deflect and open or close the contacts at the free ends of the strips depending upon the position of vane 33. When vane 33 is centered strips 40 and 41 receive equal heat from filaments 50 and 51 and deflect equally from the cold position and with ambient changes of temperature generating no relative movement therebetween. When, however, vane 33 is off center either strip 40 or strip 41 will receive more heat from its associated radiator than will the other. This is one form of thermal unbalance which can be applied to the strips and will be hereinafter referred to as vane unbalance. Vane unbalance produces relative movement of strips 40 and 41 which can cause contact operation to close either contacts 44 and 45 or contacts 45 and 46 depending on the direction of the vane unbalance. Such movement of bimetallic strips 40 and 41 is in linear relationship with the movement of vane 33 and can be considered here for explanatory reasons equal to it. Thus, if vane 33 moves 0.005 inch in a counterclockwise direction, strip 41 will move upwardly 0.005 inch with respect to strip 40. Movement of vane 33 in excess of that vane unbalance required to close either pair of contacts will generate stress in strips 40 and 41 tending to increase the pressure of the closed pair of contacts.

Under condition in which vane 33 moves in response to a variable condition measured by instrument 30 a time lag exists between the vane movement and the consequent relative movement of strips 40 and 41. The time lag, which varies with the rate of movement of vane 33, can be expressed as overlap, i. e. the movement of vane 33 between the value at which one pair of contacts close and the value at which they open. Alternatively, time lag can be expressed as the time required by vane 33 to pass through such overlap. At slow rates of vane movement, e. g. 0.05 inch per minute, the overlap is, for example, about 0.01 inch and the time lag is 12 seconds. At faster rates of vane movement, e. g. 0.25 inch per minute, the overlap is 0.025 inches and the lag is 6 seconds. Such characteristics, of course, will depend upon the time constants of strips 40 and 41 of each individual device so constructed. In each case, however, they affect the performance of a controlling agency energized through an electric circuit including contacts 44 and 45 or contacts 45 and 46 or all three.

Discarding the initial assumption that lead 62 is disconnected from terminal post 53, it will be seen that an additional factor influencing the movement of bimetallic strips 40 and 41 is occasioned by alternating unbalance of filamentary heat radiators 50 and 51 generated by alternate connection of resistor 67 to shunt one filament or the other under the influence of periodic actuator 66.

The net effect of filament unbalance upon bimetallic strips 40 and 41 is the same as that of vane unbalance; for filament unbalance also causes one of the strips 40 and 41 to receive more heat flow than the other.

The time proportioning feature of this invention is intended to overcome the effect of the time constants of the bimetallic motor, the controlling agency and the system which includes the variable condition controlled. Time proportioning according to this invention as noted above is obtained by combining the action of a thermal unbalance responsive to the condition controlled with the action of a thermal unbalance made on a periodic basis. Thus, the differential dual heat flow bimetallic motor illustrated in Fig. 1 can be used to produce time proportioning according to this invention by combining vane movement in response to the magnitude of the condition controlled with an alternating filament unbalance. The overall effect of the two thermal unbalances in heat flow to each of strips 40 and 41 is the generation of periodic contact actuation. The ratio or proportion of the period during which a pair of contacts is open or closed is governed largely by the position of vane 33; while the rate of contact operation is governed largely by the rate of operation of actuator 66, as will be more fully explained below.

Figures 2, 3A, 3B, 3C:
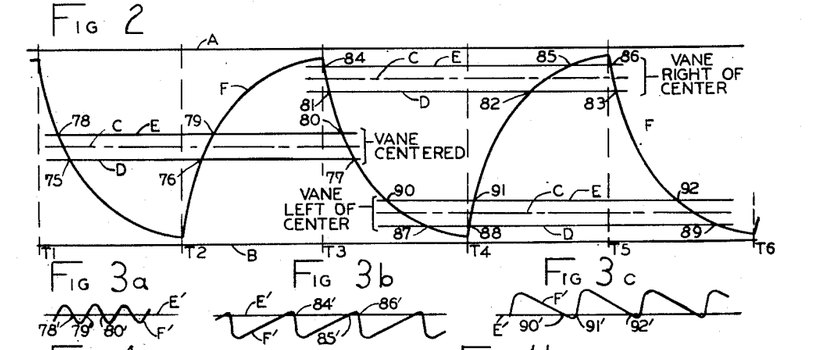
Fig. 2 illustrates an analysis of the movement of a bimetallic motor from which time proportioning is derived utilizing independent timing means in accordance with this invention.
Figs. 3a, 3b and 3c, illustrates an analysis of the movement of a bimetallic motor in which the derivation of time proportioning is automatically timed according to this invention utilizing a two-contact system of the circuit controlling device actuated by the bimetallic motor.

Fig. 2 illustrates the derivation of time proportioned contact operation from the combined action of filament and vane thermal unbalances in the device of Fig. 1. In Fig. 2 the sum of the deflections of strips 40 and 41 generated by unbalance of filaments 50 and 51 is plotted as a series of descending and ascending exponential curves, F which can be considered to represent the movement of strip 41 relative to strip 40. The sum of the deflections of strips 40 and 41 generated by unbalance of vane 33 is very slow compared to that generated by filament unbalance and consequently is plotted as a straight horizontal line C which therefor represents the position of strip 40 relative to strip 41. To illustrate the effect of vane movement, three discrete positions of vane 33 are shown, one in which vane 33 is centered causing equal heat flow to each of bimetallic strips 40 and 41, one in which vane 33 is right of the center position (rotated clockwise), and the third in which the vane is left to center.

From time $T_1$ to time $T_2$, $T_3$ to $T_4$ and $T_5$ to $T_6$ filament unbalance lowers strip 41 relative to strip 40 and, conversely, from time $T_2$ to time $T_3$ and $T_4$ to $T_5$ raises it. Timing of filament unbalance is obtained from an external source such as resistor 67, switch 65 and actuator 66. A relatively long period of filament unbalance is illustrated in Fig. 2 to magnify the exponential character of strip movement. The magnitude of the deflection depends upon the radiated heat and the degree of filament unbalance. The deflection curves F lie between two asymptotes A and B which represent the maximum deflections obtainable with infinitely long periods. The curves F are plotted, moreover, on the basis that all contacts 44, 45 and 46 are removed.

Parallel to and associated with lines C in each discrete case of vane position are lines D and E representing the lines of theoretical contact between contacts 44 and 45 and contacts 45 and 46, respectively. Lines D and E locate the contacts with reference to the position line C of strip 40 and are spaced in accordance with the mechanical clearances provided. The intersections of deflection curves F with contact lines D and E indicate the position of strips 40 and 41 at which contacts will make when they are actually in place. When curve F is above contact line E contacts 45 and 46 are closed. Below line E they are open. When curve F is below contact line D contacts 44 and 45 are closed. Above line D they are open.

The position of strip 40 relative to lines A and B is affected by vane 33. When vane 33 is centered (first discrete case), it is evident that for half the period strip 40 is above strip 41 and for the other half of the period strip 40 is below strip 41. Therefore, position line C must be located midway between asymptotes A and B. When, however, vane 33 is positioned right of center vane unbalance decreases flow of heat to strip 41 and increases flow to strip 40. In the second discrete case therefore the vane unbalance tends to raise strip 40 and lower strip 41. Consequently position line C must be raised from that of the vane centered position. Similarly when the movement of vane 33 is left of center (third discrete case) position line C is lowered with respect to the vane centered position of such line.

The position curve F of strip 41 in the first discrete case (vane center) intersects contact line D at points 75, 76 and 77 and intersects contact line E at points 78, 79 and 80. Similarly in the second case (vane right of center) position line F intersects line D at points 81, 82 and 83 and line E at 84, 85 and 86. Again in the third case (vane left of center) line F intersects contact line D at points 87, 88 and 89 and line E at points 90, 91 and 92.

A complete cycle of filament unbalance in the first discrete case is for example represented from time $T_1$ to time $T_3$. At time $T_1$ contacts 45 and 46 are in a closed position. As strip 41 descends and curve F passes through intersection 78 and contacts 45 and 46 open. At time $T_2$ the movement of strip 41 reverses as indicated by an ascending curve F which then passes through intersection 79 causing contacts 45 and 46 to close again. At time $T_3$ curve F again descends and passes through intersection 80 whereupon contacts 45 and 46 open. The time interval from intersections 78 to 79 defines for contacts 45 and 46 the contact open time and similarly the time interval from intersections 79 to 80 defines the contact closed time. Contact open time and contact closed time, it will be seen, are nearly equal. The time intervals from intersections 84 to 85 and from intersections 85 to 86 similarly define the contact performance of contacts 45 and 46 with vane 33 right of center. Here a smaller percentage of time closed is found. Again the time intervals from the intersections 90 and 91 and from intersections 91 to 92 define the performance of contacts 45 and 46 in the third case with vane 33 left of center. The third case results in a larger percentage of time closed. The performance of contacts 44 and 45 can be analyzed in a similar manner noting that the percentage of time open and percentage of time closed for contacts 44 and 45 will be the reverse of that found for contacts 45 and 46 in the second and third discrete cases.

The range of vane movement within which time proportioning can be varied from the 100 percent off to the 100 percent on time is the throttling range and is theoretically determined by asymptote lines A and B. If vane 33 moves beyond this range contact lines D and E move outside curves F and no longer intersect curves F thus prohibiting further contact actuation. Within the throttling range, however, vane 33 controls the percentage of time in each cycle that the contacts will be actuated.

Turning to Fig. 3, time proportioning according to this invention in the actuation of a controlling agency by use of a single pair of contacts 45 and 46 is analyzed. In the case illustrated in Fig. 3, assume contact 44 is removed from the device shown in Fig. 1 and assume further that actuator 66 is an electromagnetic coil connected between contacts 45 and 46 in parallel with the controlling agency energized by the electric circuit through contacts 45 and 46. Such is the essential circuit of Fig. 5, for example.

Fig. 3a illustrates the 50 percent time operated condition. Fig. 3b illustrates the 10 percent time operated condition, and Fig. 3c illustrates the 90 percent time operated condition. In each of the figures, primed reference numerals and letters corresponding to those in Fig. 2 are employed, and where possible the construction of curves has been simplified. The intersections of line $F^1$ in each case with contact line $E^1$ corresponds to those indicated in Fig. 2. It should be noted, however, that Fig. 2 was plotted on the basis that the periodic filament unbalance was independently generated, whereas in Fig. 3 automatic generation is considered. With automatic timing the contacts of the circuit controlling device either directly or by means of relays are utilized to produce a periodic filament unbalance alternating with the same period as the contact operation. As strip 41 (deflection curve $F^1$) rises from below contact line $E^1$ and intersects it, contacts 45 and 46 which were in the open position close producing a reversal of the filament unbalance tending to lower strip 41. Descending in response to such reversal of filament unbalance strip 41 (curve $F^1$) again intersects contact line $E^1$ this time causing contacts 45 and 46 to open thus again reversing filament unbalance. The oscillatory condition so produced continues with varying percentages of time required for the ascension and descent of strip 41 which depends upon the position of vane 33 relative to each path of heat flow.

As will be seen in each of the Figures 3 when strip 41 intersects contact line in either direction it continues in the same direction for a short period of time, e. g. one to three seconds, causing an overshooting. Such overshooting is occasioned by the time constant of the filaments which introduce a time delay before filament unbalance reverses.

In Fig. 3a (vane centered) the interval from intersection 79' to 80' defines the closed time for contacts 45 and 46 and similarly the interval from 78' to 79' defines the open period. One cycle of operation is defined by the interval from intersection 78' to intersection 80' and in this case the contacts are closed 50 percent of the time.

In Fig. 3b (vane right of center) which, as noted above, illustrates the 10 percent contact closed condition, curve $F^1$ represents movements of strip 41 which occur near the portion of the curve shown in Fig. 2 close to upper asymptote. The descending portion of curve F' is therefore relatively steep and requires considerably less time than the ascending portion of curve F'. As in Fig. 2 the interval between intersections 85' and 86' defines the contact closed time. The interval between intersections 84' and 86' defines one cycle.

Fig. 3c (vane left of center) which, as noted above, illustrates the 90 percent time operated condition, shows curves F' located near the lower portion of the curves shown in Fig. 2 close to lower asymptote B. The descending curves F' are therefore relatively flat and require a longer time than the ascending curves F' which follow the steep portion of the theoretical curves. The time interval between intersections 91' and 92' defines the contact closed time and the interval between intersections 90' and 92' defines one cycle.

Comparing Figs. 3 with Fig. 2 for a moment, it will be seen that the fundamental difference between independent timing and automatic timing lies in the ability of automatic timing to vary the cycle of operation. In independent timing the cycle is fixed by the actuator 66 employed.

Figure 4A:
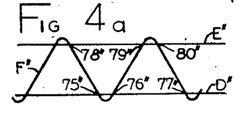
Figs. 4a, 4b and 4c, is similar to Fig. 3, however, showing the derivation of time proportioning on an automatic basis utilizing a three-contact system in the circuit controlling device.
Figure 4B:
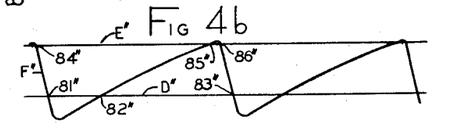
Figure 4C:
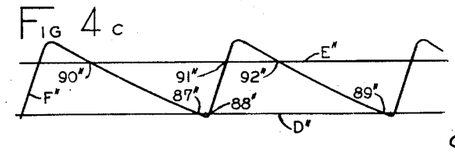

Figs. 4a and 4b and 4c are similar to Figs. 3a, 3b and 3c illustrating automatic time proportioning wherein contact 44 is also employed to control the controlling agency for the variable condition. Analysis of Figs. 4a, 4b and 4c is consequently similar to that of Figs. 3a, 3b and 3c. Double primed reference numerals and letters are employed to represent curves and intersections corresponding to those in Fig. 2.

Figure 6:
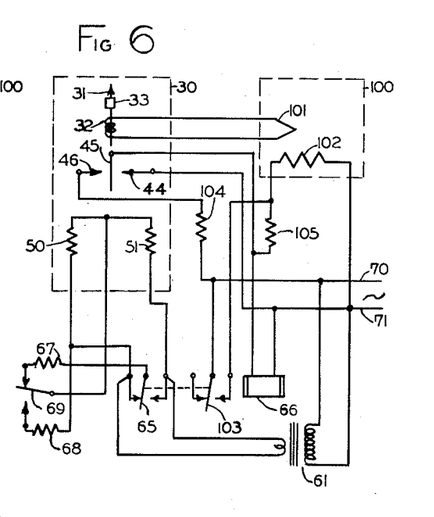
Fig. 6 is a schematic diagram of another 100 percent off-on control system employing time proportioning on a three-contact automatic basis in accordance with this invention.

Fig. 4, in particular illustrates contact movement in a system such as shown in Fig. 6, where closure of contacts 44 and 45 asserts a filament unbalance tending to raise strip 41 with respect to strip 40 and closure of contacts 45 and 46 reverses the filament unbalance. Opening either set of contacts in this circuit arrangement is prevented from having any effect upon filament unbalance.

In Fig. 4a (vane centered) as strip 41 deflects downwardly and makes contacts 44 and 45 (curve F'' intersects curve D″ at 75″) filament unbalance is reversed tending to raise strip 41. At intersection 76″ of curves F″ and D″, although contacts 44 and 45 open, filament unbalance continues to raise strip 41 until intersection 79″ when contacts 45 and 46 close, reversing filament unbalance tending to drive strip 41 down again. The time on of contacts 45 and 46 is defined by the period between intersections 79″ and 80″, for example, time on of contacts 44 and 45 is similarly defined by the period between intersections 75″ and 76″.

Figs. 4b and 4c, similarly define operation for vane right of center and vane left of center. An inspection of all three conditions illustrated in Fig. 4 reveals three contact automatic proportioning is inherently slower than either independent or two-contact automatic proportioning analyzed in Figs. 2 and 3, because the strip 41 must traverse the clearance between the contacts. Since the contacts have no function when opening, however, three contact automatic proportioning eliminiates contact chatter.

Figs. 2, 3 and 4 illustrate the movement of strips 40 and 41 under the influence of two thermal unbalances, one responsive to the condition which is controlled and the other on a periodic basis, in order to generate a time proportioned operation of the controlling agency which effects the magnitude of the condition controlled. Various circuit arrangements including the controlling agency are included in subsequent figures. The fundamental basis of this invention, however, lies in the generation of time proportioned contact operation as illustrated in Figures 2, 3 and 4.

The effect of applying maximum power for a percentage of the time is equivalent in single capacity systems to applying average power continuously provided the duration of the periods of application are short in comparison of the time constant of the system.

The temperature of a load heated by electrical energy thus varies with time in accordance with the following equations;

$$h = h_i + (H - h_i)(1 - e^{-qat_h/vps}) \quad (1)$$

This can be rewritten:

$$h = H(1 - e^{-qat_h/vps}) + h_i e^{-qat_h/vps} \quad (2)$$

The temperature of a load cooling varies with time in accordance with the following equation:

$$h = h_i e^{-qat_c/vps} \quad (3)$$

After a succession of heating and cooling cycles the temperature of the load after the last heating period approaches:

$$h = \frac{H(1 - e^{-qat_h/vps})}{1 - e^{-qa(t_h + t_c)/vps}} \quad (4)$$

and after the last cooling period approaches:

$$h = \frac{H(1 - e^{-qat_h/vps})e^{-qat_c/vps}}{1 - e^{-qa(t_h + t_c)/vps}} \quad (5)$$

The symbols are defined as follows:

$h$ is the temperature after a heating or cooling period.
$h_i$ is the temperature at the start of a period.
$H$ is the maximum temperature attainable over an infinitely long heating period.
$t_h$ is the time of the heating period.
$t_c$ is the time of the cooling period.
$q$ is the rate of heat dissipation to the surroundings per unit area.
$a$ is the area.
$v$ is the volume.
$p$ is the density.
$s$ is the specific heat.
$e$ is a constant epsilon, equal to 2.718.

The difference in temperatures after the heating and cooling periods represents a spread within which the temperature fluctuates. This is equal to Equation 4 minus Equation 5. This spread is calculated for a cycle of equal heating and cooling periods and tabulated as follows:

| Period in percent of load time constant | Spread in percent of range | Deviation from the average, percent |
|---|---|---|
| 100 | 46 | 23 |
| 50 | 24.6 | 12.3 |
| 25 | 12.5 | 6.2 |
| 5 | 2.5 | 1.25 |
| 1 | .5 | .25 |

The deviation for unequal heating and cooling periods will be about the same as that for equal periods because the shorter period of the cycle decreases proportionally with the increase in the rate of change of temperature.

In evaluating the deviation of the temperature of an electric furnace, which has distributed constants, a close approximation is attained by lumping the constants. A small furnace will, for example, have an equivalent time constant of from 20 to 30 minutes which increases with furnace wall thickness.

The analysis applies also to the charge and discharge of a condenser-resistance network by substituting its time constant RC for the thermal time constant vps/qa and the charge and discharge periods for the heating and cooling periods.

The deviations of the intermediate accessories, for example, used to average intermittent application of a controlling agency, do not react adversely on the control of the variable condition. If the time constant of the final load is larger, the deviations will be determined by its time constant, if smaller the deviations will be determined by the time constant of intermediate accessories. Other discrepancies in performance by the accessories are overcome by the differential dual heat flow bimetallic motor controlling device, which demands, by its movement within the throttling zone, adjustments which will deliver the necessary power to obtain a condition of equilibrium.

The throttling zone of the controller illustrated in Fig. 1 is very small. It can be made to approach zero by reducing the degree of filament unbalance; the throttling zone can be increased to about .1 inch of vane movement by increasing the degree of filament unbalance. A small throttling zone is of considerable importance in obtaining close regulation with slowly changing variable conditions. The degree of filament unbalance is defined as the departure from unity of the ratio of the energy radiated from the filaments. Generally, a ratio of about 1:3 is most desirable.

Figures 8, 9, 10:
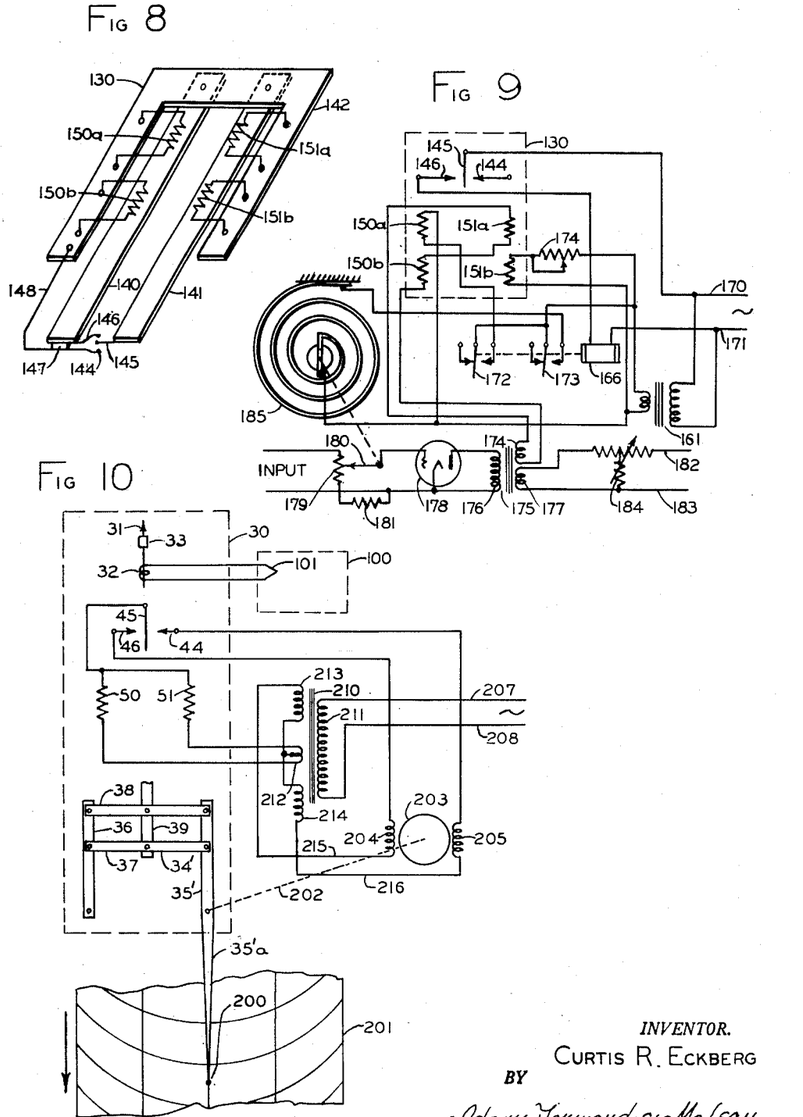
Fig. 8 illustrates in isometric and diagrammatic manner a modified arrangement of the differential dual heat flow bimetallic motor device also capable of producing time proportioning in accordance with this invention.
Fig. 9 is a schematic diagram of a 100 percent off-on control system employing automatic time proportioning in accordance with this invention utilizing the modification of the bimetallic motor shown in Fig. 8 and employing intermediate averaging.
Fig. 10 is a schematic diagram of a recording system in accordance with this invention employing a modified arrangement for generation of automatic time proportioning.

The throttling range of the differential dual heat flow bimetallic motor controller of Fig. 8 can be increased to 100 percent of the set point value by increasing the filament unbalance. The proportional action of this controller therefore extends over a greater portion of the equivalent scale range.

The independently timed cycle usually will be adjusted from 5 to 50 seconds. The automatically timed cycle will usually vary from 6 to 10 seconds when the periods are equal to 60 seconds or more for unequal periods, the short decreasing to less than a second and the long period increasing to develop the required percentage of operating time.

Figure 5:
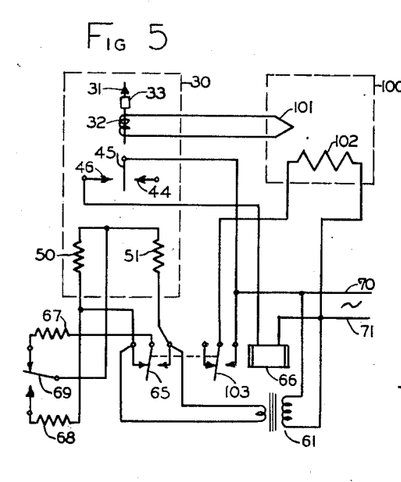
Fig. 5 is a schematic diagram of a 100 percent off or 100 percent on control system employing time proportioning on a two-contact automatic basis in accordance with this invention.

Fig. 5 illustrates an on-off two-contact control system employing automatically timed proportioning of contact operation, such as is analyzed in Fig. 3. As illustrated the system is applied to the control of electric furnace 100. The controlled condition therefore is temperature measured by thermocouple 101 in conjunction with pyromillivoltmeter 30. The controlling agent is electric power applied in the illustrated case in the form of a resistance heater 102. It should be noted that although Fig. 5 shows the thermocouple directly connected to armature 32 of meter 30, other conventional circuits may be employed to connect meter 30 to the thermocouple such as Wheatstone bridge and other potentiometric circuits.

In Fig. 5 the arrangement of the differential dual heat flow bimetallic motor to operate contacts 45 and 46 is the same as in Fig. 1; however certain differences in the external circuits applying filament unbalance have been made to produce automatic timing of contact operation rather than independent timing as shown in Fig. 1. For the purposes of the device illustrated in Fig. 5 contact 44 is not used. All reference numerals designating the parts of the meter 30 and bimetallic motor are identical to those employed in Fig. 1 where the parts are substantially the same. Thus the filaments 50 and 51 supplying heat to bimetallic elements 40 and 41 (not shown in Fig. 5) are connected in series across the secondary output of transformer 61, the primaries of which are directly connected to power lines 70 and 71. Switch 65 as in Fig. 1 is operated by solenoid 66 to generate filament unbalance by alternately unbalancing the voltage applied to filaments 50 and 51. Operation of coil 66, however, is controlled by connecting coil 66 across power lines 70 and 71 through contacts 45 and 46. Thus operation of contacts 45 and 46 directly produces the filament unbalance as shown in Fig. 3 for example. In order to operate heating unit 102 in furnace 100, a second switch 103 is ganged with switch 65, and thus is also operated electromagnetically by coil 66, to open and close the circuit connecting heating unit 102 to power lines 70 and 71 in response to the opening and closing, respectively, of contacts 45 and 46.

The temperature of furnace 100 generates a voltage in thermocouple 101 which is applied to winding 32 of pyromillivoltmeter 30 to which the differential dual heat flow bimetallic motor is connected. The frame 34 (not shown in Fig. 5, see Fig. 1) by which the bimetallic motor is connected to meter 30 is adjusted along the scale of meter 30 to a position corresponding to the desired control temperature in furnace 100. Needle 31 to which vane 33 is attached thus indicates the furnace temperature and at the same time positions vane 33 within the throttling range of the instrument as furnace 100 warms up to the desired operating temperature. Closure of contacts 45 and 46 occurs as noted above when vane 33 is left of center (ignoring filament unbalance) and thus operates resistance heater unit 102 to restore the temperature in furnace 100 to the desired value. However, operation of contacts 45 and 46 also produces operation of an alternation in filament unbalance tending to return contacts 45 and 46 to the open position if they are closed or to close them if they are open. When vane 33 is within the throttling range an oscillatory condition is thus established producing alternate actuation and de-actuation of relay operated switches 65 and 103 on a periodic basis in which the ratio of time actuated to time unactuated depends upon the position of vane 33 as described in Figs. 3a, 3b and 3c.

Resistance heater unit 102 is energized at its maximum rate in pulses as the relay operates. The long time constant of the furnace averages this periodic application of power to maintain a relatively constant temperature within the furnace.

It should be noted that if the thermocouple circuit is broken or during warm-up the position of vane 33 will be completely out of the range of the differential dual heat flow device. In such circumstances strips 40 and 41 oscillate as though the vane were centered at about 50 percent time on. This condition in some circumstances will not be adequate to raise the furnace temperature to operating level and bring the vane into the controlling range of the instrument. Switch 69 is then thrown to disconnect resistor 67, which in conjunction with switch 65 produces the filament unbalance, and substitute in its place resistor 68 in parallel with filament 50. The voltage drop over filament 50 is thereby reduced and the voltage drop over filament 51 is thereby increased producing a temporary condition of constant filament unbalance tending to close contacts 45 and 46 and operate resistance heating unit 102, 100 percent time on until the position of vane 33 moves into the throttling range at which time switch 69 is then returned to the position wherein resistor 67 is alternately shunted by switch 65.

Fig. 6 illustrates a make-break three-contact control system employing automatically timed proportioning of contact operation such as is analyzed in Fig. 4. Fig. 6 illustrates the application of such embodiment of my invention as applied to the same furnace 100 described in Fig. 5 and generally the electrical connections of the system are identical to those of Fig. 5 except the arrangement wherein contacts 44, 45 and 46 are utilized to operate coil 66. Resistance heating unit 102 is operated by switch 103 as before. In Fig. 6 the closure of contacts 45 and 46 is utilized to connect relay coil 66 across power lines 70 and 71 through resistances 104 and 105. Relay actuation then throws switch 65 to change filament unbalance and throws switch 103 to connect heating unit 102 across power lines 70 and 71. At the same time switch 103 locks up relay coil 66 and hence opening of contacts 45 and 46 has no effect on the filament unbalance or application of power to resistance heating unit 102. However, when contacts 44 and 45 are closed under the influence of either vane position or filament unbalance or both, the relay winding is short-circuited thus releasing switches 65 and 103 and de-energizing heating unit 102, changing filament unbalance to a direction tending to cause contacts 44 and 45 to open and contacts 45 and 46 to close. Consequent opening of contacts 44 and 45 has no function as contacts 45 and 46 must be closed before further operation of the device will occur. This circuit provides time proportioning of the application of maximum power in periodic pulses to a controlling agency such as heater 102 in accordance with the contact operation described in Figs. 4a, 4b and 4c.

Figure 7:
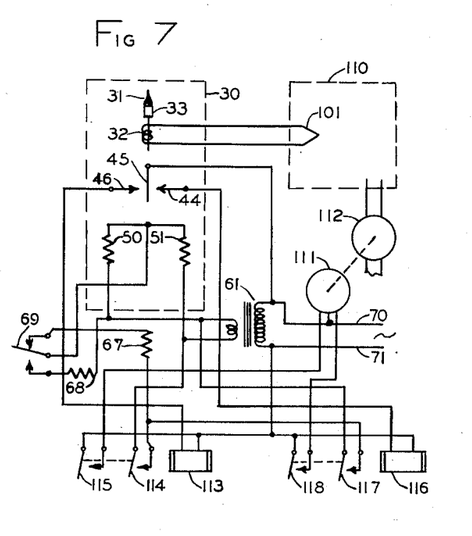
Fig. 7 is a schematic diagram of a floating control system employing automatic time proportioning in accordance with this invention.

Fig. 7 illustrates a three-position or floating control system employing automatic proportioning of contact operation. By floating control system I refer to the fact that there is a neutral or dead zone in which no control operation is required and either an increase or decrease in control action is applid outside of the dead zone depending upon which side of dead zone the magnitude of the controlled condition lies. In Fig. 7 the system is illustrated as applied to a furnace 110 heated by injected liquid fuel, the rate of injection of which is controlled by valve 112 operated by motor 111. Thermocouple 101 is utilized to produce an indication of the temperature of furnace 110 as it was utilized in connection with furnace 100 in Figs. 5 and 6. Thermocouple 101 is thus connected to winding 32 of pyromillivoltmeter 30 on which is mounted a differential dual heat flow bimetallic motor.

The external connections of filaments 50 and 51 and of contacts 44, 45 and 46 differ somewhat from those employed in the preceding figures. Filaments 50 and 51, as in Figs. 5 and 6 and Fig. 1, are connected in series across the secondary output of power transformer 61, the primary of which is connected across power lines 70 and 71. Switch 69 is utilized as before to connect shunt resistor 67 or shunt resistor 68 into the filament circuit. However, switch 65 is replaced by a pair of independent switches 114 and 117. Switch 114 is a normally open single-pole single-throw switch electromagnetically actuated by relay coil 113 to a closed position. A second single-pole single-throw switch 115 which is also normally open is ganged with switch 114. Switch 114 connects resistor 67 to shunt filament 51. Switch 117 is also a normally open single-pole single-throw switch and is closed electromagnetically by relay coil 116. A fourth normally open single-pole single-throw switch 118 is ganged with switch 117 for operation by relay coil 116. Switch 117 connects resistor 67 to shunt filament 50. Relay 113 is energized by connection by power lines 70 and 71 through contacts 45 and 46 while relay coil 116 is energized by power lines 70 and 71 through contacts 44 and 45.

Filament unbalance is therefore still derived as in the preceding figures on an automatic basis as in Figs. 5 and 6 by connection of the filament unbalance generating devices to the contacts operated by the bimetallic strips 40 and 41 with one significant difference, however. In between the operative positions of contacts 45 and 46 and the operative positions of contacts 44 and 45 there is no filament unbalance generated, the position of vane 33 then being the sole controlling device affecting the differential dual heat flow bimetallic motor.

Extra switches 115 and 118 connected to relay coils 113 and 116, respectively, are connected to motor 111, switch 115 closing power to a winding of motor 111 tending to open valve 112 while closure of switch 118 connects a winding of motor 111 reversing the direction of operation of motor 111 tending to close valve 112.

When vane 33 is up scale vane unbalance effects closure of contacts 44 and 45 thus energizing relay 116, closing the power circuit to motor 111 tending to close valve 112 and decrease fuel flow to furnace 110. At the same time a filament unbalance is imposed by actuation of switch 117 tending to open contacts 44 and 45. When the cooperative action of vane 33 and the filament unbalance so imposed upon the device effects an opening of contacts 44 and 45, relay 116 releases to stop motor 111 and restore the filament balance. As this cycle is short, i. e., a few seconds in duration, it may be repeated many times until the vane is brought into the dead zone by the change in magnitude of the controlled variable. During these cycles the operation of contacts 44 and 45 is time proportioned; the percentage of time the contacts are closed increases with the deviation from the dead zone (or with the extent of departure of the vane from the dead zone). The effect of this time proportioning is to operate motor 111 in a decrease direction in a series of spurts, the lengths of the spurts diminishing as the position of vane 33 approaches the dead zone. The dead zone is that region in which vane 33 balances the heat flow to strips 40 and 41 so that contact 45 does not touch either contact 44 or 46.

Similarly, when the controlled variable is less than the desired value and vane 33 is downscale from the dead zone, contacts 45 and 46 operate on a time proportioned basis to energize motor 111 and drive valve 112 in the increase direction in a series of spurts until the vane again enters the dead zone.

The size of the dead zone, as measured by the movement of vane 33 necessary to pass through it, is largely determined by the mechanical clearances provided between the contacts. This zone defines the lower edge of the upper throttling range and the upper edge of the lower throttling range. The remaining edges of the throttling ranges depend on the degree of filament unbalance and the vane movement necessary to block out the radiation from one filament to its strip.

Valve 112 consequently remains at rest whenever the vane enters the dead zone and is moved only when the vane enters either of the throttling ranges. The action of the motor by variable spurts is equivalent to a variable speed floating control.

The arrangement of Fig. 7 can readily be converted for recording purposes by disconnecting motor 111 from valve 112 and by connecting the drive shaft on motor 111 to drive frame 34 (see Fig. 1) to follow the movement of vane 33, for example by connection of the drive shaft to frame 34 in place of knob 60 (see Fig. 1). A stylus attached to frame 34 can then be used to trace the position of vane 33 on moving graph paper. Such an arrangement, as should readily be apparent, has no fixed set point and will not, without further modification, function for control purposes.

Fig. 8 illustrates a variation of the differential dual heat flow bimetallic motor controller of Fig. 1 in which the thermal unbalance produced by vane movement is replaced by a thermal unbalance produced by an additional pair of filaments, such unbalance being governed by the magnitude of the variable condition which is to be controlled. The reference numeral 130 is employed to indicate the device as an assembly which includes a U-shaped bracket 142 formed of insulating material.

A pair of bimetallic strips 140 and 141 are mounted parallel to each other secured to bracket 142 at one pair of adjacent ends, while the other pair of adjacent ends of strips 140 and 141 are free to move in response to changes of temperature. The strips 140 and 141 are disposed so that they will move without relative change of position of their free ends for an identical temperature change in each.

As in the device of Fig. 1, a contact 145 is affixed to the free end of strip 141, electrical connection to such contact being down through strip 141. A contact 146 is similarly affixed to the free end of strip 140 while a contact 144 is affixed to the free end of strip 140 and insulated therefrom by insulated block 147. An electrical lead 148 is employed for appropriate electrical connection to contact 144.

A pair of heat radiators 150a and 151a, e. g. electrically energized filaments, are supported on bracket 142 opposite and parallel to each other, filament 150a being supported so that heat radiated from it will affect the temperature of bimetallic strip 140 and filament 151a being supported so that heat radiated from it will affect bimetallic strip 141. A second pair of filaments 150b and 151b are similarly mounted on bracket 142 to radiate heat when energized which will affect bimetallic strips 140 and 141, respectively.

It is, of course, not essential that filaments 150a, 150b, 151a and 151b heat bimetallic strips 140 and 141 by radiation, since no mechanical means is employed to intercept heat flow from the filaments to the bimetallic strips. An equally possible construction is to employ heat transfer by conduction. This is accomplished most simply by winding each filament directly about the bimetallic strip it is to heat.

The device shown in Fig. 8 is equivalent to the device shown in Fig. 1 and may have similar electrical connections made to either of filaments 150a or 150b and to either of filaments 151a or 151b, in order to produce filament unbalance as utilized in the device of Fig. 1 and described in subsequent Figs. 2–7. The remaining pair of filaments is employed to produce a second filament unbalance which is substituted for vane unbalance of the device shown in Fig. 1. The filament unbalance of the second pair of filaments in the device in Fig. 8 is therefore controlled by the variable condition to be controlled.

Analysis of contact movement is identical to that shown in Figs. 2–4 and the device of Fig. 8 can be used to control the magnitude of a variable condition by the application of a controlling agency to such condition according to an independently timed or automatically timed proportioning in accordance with this invention.

The device of Fig. 8 is particularly well suited to the control of a variable which is irregular, spasmodic or pulsed. Speech exemplifies these characteristics. Its syllabic nature produces bursts of energy with irregular pauses between phrases and sentences and during listening intervals. A variety of speakers produce volume ranges of considerable magnitude. The bimetallic strips provide an excellent means for averaging this form of energy.

The sensitivity of the controller of Fig. 8 is, however, less than that of the vane type because the energy from the variable is applied directly to the heating filaments. From .05 to .5 watt ordinarily will be needed. Such amounts of energy are usually available from vacuum tube amplifiers associated with communication facilities, hence the device is not handicapped by its lower sensitivity in such usage.

Fig. 9 illustrates a particular application of the controller shown in Fig. 8 as a differential dual heat flow bimetallic motor device to produce a make-break two-contact control system with automatically timed proportioning of contact operation in the regulation of the volume of voice or carrier frequency speech by adjustment of the gain of a vacuum tube amplifier inversely with the input volume.

In the arrangement of Fig. 9 condition responsive filament unbalance is developed in filaments 150b and 150a, while automatically timed filament unbalance is produced in filaments 150a and 151b. The box indicated with the reference numeral 130 represents the device of Fig. 8. It will be seen that the associated control equipment includes a filament transformer 161 the primary of which is connected to power lines 170 and 171, a pair of normally open single-pole single-throw switches 172 and 173 electromagnetically actuated by relay coil 166 which is connected to power lines 170 and 171 through contacts 145 and 146. Filament 151b is directly connected across the secondary of transformer 161 in series with a variable resistor 174. Filament 150a is directly connected across the secondary of transformer 161 in series with switch 172. Filaments 151a and 150b are connected in series across the secondary winding 174 of a transformer 175 having a primary winding 176 and two secondary windings 174 and 177. In the device of Fig. 9, for reasons which will be apparent later, the electrical resistances of filaments 150a and 151a are equal, and the electrical resistances of filaments 150b and 151b are equal, but are substantially greater than the resistances of filaments 150a and 151a.

The speech input is coupled to the grid of triode 178 through adjustable tap 180 on potentiometer 179 connected across the input. A resistor 181 is connected in series with potentiometer 179 to limit the minimum percentage of the input signal which can be applied to the grid of triode 178. The primary winding of output transformer 175 is connected in the plate circuit of tube 178. Secondary 177 of transformer 175 is connected to output lines 182 and 183 through a variable attenuator 184. The position of potentiometer tap 180 is set by a bimetallic spring motor 185 connected across the output winding of transformer 161 in series with switch 173.

In the arrangement of Fig. 9 as indicated previously the equivalent of vane unbalance is developed in filaments 150b and 151a. Energy derived from the controlled variable, responsive to changes in input speech volume, is dissipated in filaments 150b and 151a to supply heat to strips 140 and 141, respectively (not shown in Fig. 9), and thus controls the relative position of contact 146 with respect to the position of contact 145, since the resistance of filament 150b is greater than that of 151a. A constant supply of energy, adjustable by potentiometer 174 to a suitable point, is dissipated in filament 151b to supply heat to strip 141.

When the energies described above are balanced to each bimetallic strip 140 and 141, contact 145 will remain unconnected with either contact 144 or contact 146. Upon a decrease in the magnitude of the variable (signal across input circuit resistors 179 and 181) the signal voltage developed in secondary 174 of transformer 175 will decrease resulting in a decrease in the heat radiated by filaments 151a and 150b establishing a thermal unbalance equivalent to a down-scale vane unbalance in Fig. 1 tending to close contacts 145 and 146, since the decrease will be greater in the heat radiated by filament 150b than by filament 151a. Similarly, an increase of signal applied to resistors 179 and 181 will establish a thermal unbalance in the heat radiated to bimetallic strips 140 and 141 equivalent to an up-scale vane unbalance of the device shown in Fig. 1 tending to open contacts 145 and 146.

For the sake of clarity, the thermal unbalances produced by variations of the heat radiated by filaments 151a and 150b will be referred to as signal unbalances whereas variations in the heat radiated by filaments 150a and 151b will be referred to as filament unbalances as before. Such filament unbalance is developed when relay 30 is released opening the connection through switch 172 to filament 150a. Filament unbalance in Fig. 9 tends to cause contacts 145 and 146 to close while restoration of filament balance by closure of switch 172 tends to open contacts 145 and 146. As will be observed, filament unbalance being controlled by the actuation of switch 172 is thus produced upon opening of contacts 145 and 146 and thus is in all respects similar to the filament unbalance produced in the circuit arrangement of Fig. 5. Obviously a periodic filament unbalance will be produced when signal unbalance is within a throttling range approaching signal balance. Adjustment of resistor 174 serves to set the desired signal balance point.

The construction of the device permits considerable variation in the resistance of the various filaments. Generally the energy radiated by filament 151a should be less than that radiated by filament 150b and hence its resistance is less. Overall adjustments of filament energization are provided so that at the set point of operation the heat radiated by filament 150b is less than the sum of heat radiation by filaments 151a and 151b and so that the heat radiated by filament 150a will be greater than the sum of the radiation of filaments 151a and 151b less the radiation of filament 150b. When these relationships are satisfied the unbalance will develop timed proportioned contact operation within a throttling range approaching the set point. The throttling range can be defined in milliwatts or decibels or other suitable measurable variables to cover a power range applied to filament 150b in which proportional control is obtained.

As will be seen, actuation of switch 173 connects a low voltage from the output or transformer 161 through bimetallic spring motor 185. The heat generated by the flow of current through the motor expands the spiral to rotate tap 180 on potentiometer 179 tending to increase the overall gain of the amplifier by increasing the percentage of the input signal coupled to triode 178. Time proportioned operation of the circuit through switch 173 interrupts the power dissipated in spring 185 in short intervals compared with the time constant of spring 185. Thus the bimetallic spring motor averages the power applied to it and deflects proportionately with the time-on percentage. In a typical device, from about 10 to 40 watts are required to develop maximum deflection of bimetallic spring motor 185.

In the system illustrated the energy dissipated in filament 151a is derived from the variable to minimize over-correction tendencies. In communication circuits the volume changes over extremely wide limits, 30 to 40 decibels, equivalent to 10,000 to 1. If high level speech follows low level speech which has adjusted the amplifier to high gain, so much energy is dissipated in filament 150b as to excessively heat strip 140. The time required for the strip to cool enough to open contacts 145 and 146 is excessive and over-correction results. With energy in filament 151a also derived from the same source, strip 141 is also heated enough to reduce this over-correction.

During periods of silence the controller will slowly increase the amplifier gain. At the high gain position the decrease rate is a maximum and readjustment of the amplifier gain is quickly established when speech is applied.

The arrangement of Fig. 10 illustrates a three position recorder system wherein a differential dual heat flow bimetallic motor of the type shown in Fig. 1 is employed to drive a stylus transversely of a moving sheet of graph paper to record, for example, the temperature of a furnace. Contact operation is time proportioned on an automatic basis in accordance with this invention.

In Fig. 10 the reference numeral 30 indicates a pyromillivoltmeter having indicating needle 31 rotated by armature coil 32. Coil 32 is connected in series with thermocouple 101 located in furnace 100, and consequently the angular position of indicating needle 31 and hence the position of vane 33 attached to needle 31 is determined by the temperature in furnace 100. A rotatable frame 34' is mounted on instrument 30 in a manner identical to that of frame 34 shown in Fig. 1. A pair of bimetallic strips 40 and 41 (not shown in Fig. 10) and a pair of filaments 50 and 51 are mounted on frame 34' positioned on opposite sides of the path of travel of vane 33, as in Fig. 1. Frame 34' differs from frame 34 shown in Fig. 1 solely in that link 35 is replaced by link 35' which has an extension 35'a to the remote end of which a stylus 200 is affixed. Stylus 200 is disposed to ink a line on a moving sheet of graph paper 201 in a manner conventionally employed in recorders. The transverse position of stylus 200 on graph paper 201 is determined by the angular position of frame 34' with respect to instrument 30. Knurled knob 60, attached to frame 34 in Fig. 1, is replaced by the output shaft 202 of a small A. C. motor 203 having a pair of reversely wound stator coils 204 and 205. Energization of coil 204 causes motor 203 to drive frame 34', and consequently the filament and strip assembly and stylus 200, in a downscale direction, while energization of coil 205 drives frame 34' in an upscale direction.

The bimetallic strips are fixed at one end of each and are free at their opposite ends to move in response to changes of temperature. Thus bimetallic strips 40 and 41 operate contacts 44 and 45, and 45 and 46 by relative movement of their free ends, identically as in Fig. 1.

In Fig. 10 the mechanical switching arrangements for applying filament unbalance have been obviated by routing the circuits through contacts 44, 45 and 46 through filaments 50 and 51 in such a manner that contact operation causes load current flow through the filaments in phase with the filament current flowing in one and in opposite phase with the filament current flowing in the other. Contact operation is thus utilized to generate filament unbalance on an automatic timing basis in accordance with this invention.

In the illustrated case (Fig. 10) power for filaments 50 and 51 and for motor 203 is drawn from secondary windings of transformer 210, the primary winding 211 of which is connected across A. C. power lines 207 and 208. Transformer 210 has a center-tapped secondary winding 212 which is connected in series with filaments 50 and 51. Transformer 210 also has two additional identical secondary windings 213 and 214 connected in phase with each other and with winding 212 with their common connection tied to the center-tap of winding 212. The remaining lead 215 of winding 213 is connected through motor stator winding 204 to contact 46. The remaining lead 216 of winding 214 is connected through motor stator winding 205 to contact 44. The common connection of filaments 50 and 51 is connected to contact 45. Closure of contacts 44 and 45 will thus energize motor 203 to drive frame 34' upscale, and closure of contacts 45 and 46 will drive frame 34' downscale on instrument 30.

When contacts 44 and 45, and 45 and 46 are open, current through filaments 50 and 51 will be equal and the heat radiated to strips 40 and 41 will consequently be equal, assuming vane 33 is in a balanced position. Stylus 200 will then be scribing a line on graph paper 201 indicating the temperature of furnace 100 corresponding to the position of vane 33 and needle 31.

If the temperature in furnace 100 drops, needle 31 will fall downscale repositioning vane 33 to heat strip 41 more than strip 40 and thus effect closure of contacts 45 and 46. Winding 204 is thus energized and motor 203 drives frame 34' downscale causing stylus 200 to travel transversely across graph paper 201 to record a lower temperature in furnace 100.

Closure of contacts 45 and 46, however, imposes a filament unbalance on strips 40 and 41 tending to open contacts 45 and 46 because the load current through winding 205 and winding 213 is in phase with the filament current through filament 50 but in opposition to the filament current through filament 51 and because the subsequent filament unbalance tends to heat strip 40 more than strip 41.

Contacts 45 and 46 then open to restore the filament balance and stop motor 203. As this cycle is short, i. e., a few seconds in duration, it may be repeated many times until frame 34' is centered with vane 33. During these cycles the operation of contacts 45 and 46 is time proportioned as described also for Fig. 7. The frame is moved in a series of spurts to center it, the spurts diminishing in duration as the centering is reached. Similarly, if vane 33 moves upscale contacts 44 and 45 operate on a time proportioned basis to move the frame upscale.

As discussed with reference to Fig. 7, employment of this invention to drive a recorder of a variable is normally inconsistent with operation of the device of this invention as a controller for the variable. Ordinarily a separate controller is required. It is, however, possible to control the variably directly and avoid the inconvenience of two separate indicating instruments. The angular position of motor shaft 202, for example, is directly a function of the magnitude of the controlled variable and a set angular position of shaft 202 can be chosen to correspond to any desired set point on instrument 30. Movement of shaft 202 departing from such set condition can then be coupled to operate a controlling agency for restoring the controlled condition to such set point. Since operation of motor 203 is proportioned according to this invention, actuation of the controlling agency thereby is also proportioned according to this invention.

From the preceding descriptions it will be seen that the proportioning device of my invention is readily adaptable to the control or recording or both of many variable conditions. Although I have illustrated only the control of furnace temperature and amplifier gain, the device of my invention can be employed to regulate the application of a controlling agency for any variable condition to hold the variable condition at a set value when the magnitude of the variable condition can be measured by a device producing an electrical potential or a mechanical movement which is a function of the magnitude of the variable condition, and when the application of the controlling agency to the variable condition can be controlled by electrical means.

I claim:

1. A control system for effecting automatic regulation of a variable condition, which comprises a pair of bimetallic elements disposed parallel to each other fixed in position at one pair of adjacent ends, a circuit controlling device operated by relative movement of the opposite pair of adjacent ends of said bimetallic elements, a controlling agency for affecting the magnitude of said variable condition actuated by an electrical circuit including said circuit controlling device, means separately radiating heat to each of said bimetallic elements, means responsive to the magnitude of said variable condition differentially affecting the heat radiated to said bimetallic elements such that the heat radiated to the bimetallic elements is balanced with the magnitude of the variable condition at a set value and such that the heat radiated to the bimetallic elements is differentially unbalanced as a function of the departure of the magnitude of said variable condition from said set value and second means separate from said means responsive to the magnitude of said variable condition differentially affecting the heat radiated to each of the bimetallic elements generating a periodic differential unbalance in the heat radiated to the bimetallic elements.

2. A control system according to claim 1 in which the means generating a periodic differential unbalance in the heat radiated to said bimetallic elements operates in response to the operation of said circuit controlling device.

3. A control system according to claim 1 in which the means generating a periodic differential unbalance in the heat radiated to said bimetallic elements operates independently of the operation of the control system.

4. A control system for effecting automatic regulation of a variable condition, which comprises an instrument for measuring said variable condition, an indicating member operated by said instrument having a path of travel positionally responsive to the magnitude of the variable condition, a vane which is opaque to heat fixed to move with said indicating member, a frame attached to said instrument, a pair of bimetallic elements disposed parallel to each other secured at one pair of adjacent ends of said frame, a pair of heat radiating elements supported by said frame and disposed such that one heat radiating element radiates heat to one of the bimetallic elements and the other heat radiating element radiates heat to the other of the bimetallic elements, said heat radiating elements being further disposed such that the path of travel of said vane produced by movement of said indicating member lies between associated pairs of heat radiating elements and bimetallic elements in such a manner that said vane is positionable to intercept differentially the radiation of heat to the bimetallic elements, circuit controlling device operatively connected to the opposite pair of adjacent ends of said bimetallic elements, a controlling agency for affecting the magnitude of said variable condition actuated by an electrical circuit including said circuit controlling device, means for positioning said frame relative to the path of travel of said vane such that its position at a set value of the magnitude of the variable condition will differentially balance the heat radiated from said heat radiating elements to said bimetallic elements, and means separate from said indicating member for energizing said heat radiating elements to produce a periodic differential unbalance in the heat radiated by the heat radiating elements to the bimetallic element.

5. A control system according to claim 4 in which the means generating a periodic differential unbalance in the heat radiated to said bimetallic elements operates in response to the operation of said circuit controlling device.

6. A control system according to claim 4 in which the means generating a periodic differential unbalance in the heat radiated to said bimetallic elements operates independently of the operating of the control system.

7. A control system for effecting automatic regulation of a variable condition, which comprises a frame, a pair of bimetallic elements disposed parallel to each other secured at one pair of adjacent ends to said frame, a first pair of heat radiating elements supported by said frame such that one of said first pair of heat radiating elements radiates heat to one of the bimetallic elements and the other of said first pair of heat radiating elements radiates heat to the other of the bimetallic elements, a second pair of heat radiating elements supported by said frame such that one of said second pair of heat radiating elements radiates heat to one of the bimetallic elements and the other of said second pair of heat radiating elements radiates heat to the other of the bimetallic elements, means energizing the first pair of heat radiating elements such that the heat radiated by said pair of heat radiating elements varies differentially in response to and as a function of the magnitude of said variable condition, means energizing said second pair of heat radiating elements separately from said first named pair of heat radiating elements to produce a periodic differential unbalance in the heat radiated by said second pair of heat radiating elements to said bimetallic elements, a circuit controlling device operatively connected to the opposite pair of adjacent ends of said bimetallic elements, a controlling agency for affecting the magnitude of said variable condition actuated by an electrical circuit including said circuit controlling device.

8. A control system according to claim 7 in which the means generating a periodic differential unbalance in the heat radiated to said bimetallic elements operates in response to the operation of said circuit controlling device.

9. A system according to claim 7 in which the means generating a periodic differential unbalance in the heat flow to said bimetallic elements operates independently of the operation of the control system.

10. A control device which comprises a pair of bimetallic elements disposed parallel to each other fixed in position at one pair of adjacent ends, a circuit controlling device operated by relative movement of the opposite pair of adjacent ends of said bimetallic elements, means separately radiating heat to each of said bimetallic elements, means responsive to the magnitude of an external variable differentially affecting the heat radiated by said heat radiating means to said bimetallic elements as a function of said magnitude, and means separate from said means responsive to the magnitude of said external variable differentially affecting the heat radiated by said heat radiating means to said bimetallic elements on a periodic basis.

11. A control device which comprises a pair of bimetallic elements, each said bimetallic element being fixed in position at one end with another end free to move in response to changes in temperature, a circuit controlling device operated by relative movement of the free ends of said bimetallic elements, means separately heating each of said bimetallic elements, means responsive to the magnitude of an external variable differentially affecting the heat received by said bimetallic elements from said heating means as a function of said magnitude, and means separate from said means responsive to the magnitude of said external variable differentially affecting the heat received by said bimetallic elements from said heating means on a periodic basis.

12. A system for recording the magnitude of a variable condition, which comprises a pair of bimetallic elements disposed parallel to each other fixed in position at one pair of adjacent ends, a circuit controlling device operated by relative movement of the opposite pair of adjacent ends of said bimetallic elements, means separately radiating heat to each of said bimetallic elements, means responsive to the magnitude of said variable condition differentially affecting the heat radiated to said bimetallic elements such that the heat radiated to the bimetallic elements is balanced with the magnitude of the variable condition at a set value and such that the heat radiated to the bimetallic elements is differentially unbalanced as a function of the departure of the magnitude of said variable condition from said set value, means separate from said means responsive to the magnitude of said variable condition differentially affecting the heat radiated to each of the bimetallic elements generating a periodic differential unbalance in the heat radiated to the bimetallic elements, means actuated by an electrical circuit including said circuit controlling device affecting the set value at which the heat radiated to said bimetallic elements is balanced by said means responsive to the magnitude of the variable condition, and recorder means actuated by said circuit controlling device to record the magnitude of the variable condition.

13. A control system for effecting automatic regulation of a variable condition, which comprises a pair of bimetallic elements, each said bimetallic element being fixed in position at one end with another end free to move in response to changes in temperature, a circuit controlling device operated by relative movement of the free ends of said bimetallic elements, a controlling agency for affecting the magnitude of said variable condition actuated by an electrical circuit including said circuit controlling device, means separately supplying heat to each of said bimetallic elements, means responsive to the magnitude of said variable condition differentially affecting the heat supplied to said bimetallic elements such that the heat supplied to the bimetallic elements is balanced with the magnitude of the variable condition at a set value and such that the heat supplied to the bimetallic elements is differentially unbalanced as a function of the departure of the magnitude of said variable condition from said set value and second means separate from said means responsive to the magnitude of said variable condition differentially affecting the heat supplied to each of the bimetallic elements generating a periodic differential unbalance in the heat supplied to the bimetallic elements.

14. A system for recording the magnitude of a variable condition, which comprises a pair of bimetallic elements, each said bimetallic element being fixed in position at one end with another end free to move in response to changes in temperature, a circuit controlling device operated by relative movement of the free ends of said bimetallic elements, means separately supplying heat to each of said bimetallic elements, means responsive to the magnitude of said variable condition differentially affecting the heat supplied to said bimetallic elements such that the heat supplied to the bimetallic elements is balanced with the magnitude of the variable condition at a set value and such that the heat supplied to the bimetallic elements is differentially unbalanced as a function of the departure of the magnitude of said variable condition from said set value, means separate from said means responsive to the magnitude of said variable condition differentially affecting the heat supplied to each of the bimetallic elements generating a periodic differential unbalance in the heat supplied to the bimetallic elements, means actuated by an electrical circuit including said circuit controlling device affecting the set value at which the heat supplied to said bimetallic elements is balanced by said means responsive to the magnitude of the variable condition, and recorder means actuated by said circuit controlling device to record the magnitude of the variable condition.

References Cited in the file of this patent

UNITED STATES PATENTS

| 1,979,713 | Smulski | Nov. 6, 1934 |
| 2,055,705 | Prinz | Sept. 29, 1936 |
| 2,148,491 | Moore | Feb. 28, 1939 |
| 2,220,028 | Smith | Oct. 29, 1940 |
| 2,376,488 | Jones | May 22, 1945 |
| 2,629,005 | Engelhard | Feb. 17, 1953 |

FOREIGN PATENTS

| 622,282 | Germany | Nov. 25, 1935 |
| 730,547 | Germany | Jan. 14, 1943 |